United States Patent [19]
Shen et al.

[11] Patent Number: 5,952,963
[45] Date of Patent: Sep. 14, 1999

[54] ADVANCED ANTENNA DIVERSITY MECHANISM

[75] Inventors: Qun Shen, Cary; Michael Lenzo, Apex, both of N.C.

[73] Assignee: Ericsson Inc., Research Triangle Park, N.C.

[21] Appl. No.: 09/001,177

[22] Filed: Dec. 30, 1997

[51] Int. Cl.$^6$ .............................. H04B 7/00; H01Q 11/12
[52] U.S. Cl. .......................... 342/367; 375/347; 455/133
[58] Field of Search .................................. 342/374, 367; 375/347; 455/133, 134, 135

[56] References Cited

U.S. PATENT DOCUMENTS

| 5,613,225 | 3/1997 | Charas . | |
|---|---|---|---|
| 5,649,287 | 7/1997 | Forssén et al. . | |
| 5,687,152 | 11/1997 | Takeda et al. | 369/103 |
| 5,742,896 | 4/1998 | Bose et al. | 455/133 |
| 5,805,643 | 9/1998 | Seki et al. | 375/347 |
| 5,859,870 | 1/1999 | Tsujimoto | 375/200 |

FOREIGN PATENT DOCUMENTS

| 0 676 870 A1 | 8/1994 | European Pat. Off. . |
| 0 666 654 A2 | 3/1995 | European Pat. Off. . |
| 0 755131 A2 | 1/1997 | Germany . |
| WO 94/10764 | 5/1994 | WIPO . |
| WO 94/15411 | 7/1994 | WIPO . |
| WO 96/02984 | 2/1996 | WIPO . |

OTHER PUBLICATIONS

J. Proise, "Digital Signatures: How They Work," PC Magazine; http://www.zdnet.com/pcmag/issues/1507/pcmg0090.htm.
VG–AnYLan Testing Service, "Cyclical redundancy Check," http://www.iol.unh.edu/training/vganylan/tech/vg-concepts/frame/crcsum.html.
VG–ANYLan Testing Service, "Frame Check Sequence," http://www.iol.unh.edu/training/vganylan/teach/vgconcepts/frame/fcs.html.
VG–ANTLan Testing Service, "Frame Detail: FCS," http://www.iol.unh.edu/training/fddi/htmls/FCS.html.
Lectrosonics, Wireless Guide, "Diversity Reception," http://www.lectro.com.lectro/wg/wgdiv.htm.
S. Safavi, L.B. Lopes, Novel Techniques For Performance Optimisation Of Dect Receivers With non–linear Front–End, Electronic and Electrical Engineering Department, The University of Leeds Leeds LS2 9JT, UK, 1966 IEEE.
S. Safavi, L.B. Lopes, P.E. Mogensen and F. Frederiksen, An Advaced Base Station Receiver Concept For Dect, Electronic and Eletrical Enigineering Department, The University of Leeds Leeds 9JT, UK 1955 IEEE.

*Primary Examiner*—Mark Hellner
*Attorney, Agent, or Firm*—Brinks Hofer Gilson & Lione

[57] ABSTRACT

A system for selecting an antenna from a diversity of antennas in a DECT, PWT, or TDMA-based telecommunication system is disclosed. The system combines multiple criteria to improve antenna diversity selections. The principal selection process is based on preamble diversity comparisons that operate in real-time. A preamble diversity switching circuit measures receive signal strength indicators (RSSI) from a plurality of antennas and selects the antenna that provides the highest RSSI value when the difference between the RSSI values exceeds a predetermined threshold. When the value of the RSSI difference falls below the predetermined threshold, a cyclical redundancy check process (CRC) and a vector detection process (SVD) are employed jointly. The CRC process decodes a CRC value from a signal's content and compares it to a predetermined threshold. If a CRC error is detected a first weighted function is calculated. In a first SVD process, the difference between a reference signal vector and a received signal vector is computed. If an SVD error is detected a second weighted function is calculated. When the sum of the first and second weighted factors is greater than a predetermined threshold antenna selection occurs. When the threshold is not met, diversity selections remain unchanged and control of the antenna selection process returns to the preamble diversity switching process. It should be noted, the SVD process may also be based on the gradient error vector, $\nabla f(E_{k,n1})$, which represents the magnitude of the received signal's rate of change.

36 Claims, 6 Drawing Sheets

ADVANCED ANTENNA DIVERSITY MECHANISM

RELATED REFERENCES

The present embodiments utilize the processes and teachings disclosed in U.S. patent applications Ser. Nos. 09/000,593 and 09/000,643 filed Dec. 30, 1997 both pending (attorney's docket numbers 8993/7, 8993/12) entitled "An Improved Antenna Diversity Switching System for TDMA Based Telephones" and "A Unified Antenna Diversity Switching System for TDMA-Based Telephones" that were filed concurrently with this application and are hereby incorporated by reference. The present specification integrates the processes previously described.

BACKGROUND OF THE INVENTION

This disclosure relates to a process for selecting an antenna in a wireless communication system having at least two antennas. In particular, the present invention is designed to select the best antenna based on a plurality of quality indicators.

In wireless communication systems, incoming signals often experience time dispersion and fading which is referred to as multipath effect. Multipath effect occurs when a signal and its replica arrive at a receiver out of phase to any extent. Generally, multipath effect occurs because artificial and natural obstructions cause transmitted signals to follow several propagation paths from a transmitter to a receiver. In wireless technology, the phase differences of the signals arriving at the receiver produce background noise, and in severe cases, cause the receiver to squelch. Conventional wireless technology utilizes antenna diversity to minimize this problem. A wireless network commonly includes more than one antenna positioned such that the signals received by the antennas are not correlated.

In DECT (Digital Enhanced Cordless Telecommunications) and PWT (Personal Wireless Telecommunications) systems, for example, two antennas are available in the base station and/or portable. FIG. 1 illustrates a block diagram of a conventional wireless base station having a diversity of antennas.

When more than one antenna is used in a wireless system, a protocol is employed to select the best antenna. Normally, antenna selection is based on a singular quality indicator adapted from the field of cryptography. The kinds of quality indicators may be divided into two categories namely: (1) those which are designed to authenticate signal transmissions and select an antenna as the signal is received and (2) those which are designed to authenticate signal transmissions and select an antenna after the signal is received. Known devices of both types have drawbacks and disadvantages.

In a TDMA-based system, for example, the antenna selection is controlled by software or logic circuitry. In this system, a cyclical redundancy check (CRC) like parameter is generally used to select an antenna after the signal is received. CRC is based on polynomial division in which each bit of a packet of data represents one coefficient of a polynomial. The polynomial is then divided by a pre-programmed polynomial to yield a quotient polynomial and in some cases a remainder polynomial. When the division yields a remainder polynomial, the system assumes that a transmission error occurred and selects another antenna. If, however, the division does not yield a remainder polynomial, the system assumes no transmission errors occurred and therefore does not select another antenna.

The antenna selection process is illustrated in FIG. 2. A CRC error rate that produces good speech quality is used as a threshold for selecting an appropriate antenna. If the present antenna provides a CRC error that is below the threshold value, no switching occurs. However, when the CRC error rate rises above the threshold value, another antenna is selected.

While CRC provides antenna selection by authenticating transmitted data, it has disadvantages. Its primary shortcoming is that antenna selections are not made in real time. The present antenna selected is based on a previous CRC comparison which does not change until the antenna receives a poor quality signal. The time delay that exists between receiving an incoming signal and selecting another antenna makes the selection process susceptible to errors due to interference. A CRC selection may be accurate if a transmitter or receiver is stationary or moves at a slow rate of speed, because the communication environment is subject only to slight variations in time. However, when a transmitter or receiver moves at a high rate of speed, this time delayed process may be ineffective because it may not react to a changing environment and thus, it may be susceptible to interference.

Another technique for antenna diversity switching authenticates signal transmissions and selects an antenna as the signals are received. Preamble diversity switching is an example of a system that provides real-time measurements and real-time antenna selection. Preamble diversity switching sequentially measures the receive signal strength of a diversity of antennas at the beginning of each extended preamble. The receive signal levels of each antenna, which are the Receive Signal Strength Indicators (RSSI), are stored and compared. The antenna with the higher RSSI value is selected. When the RSSI value associated with another antenna is higher, that antenna is then selected. An example of a preamble diversity switching process is shown in FIG. 3.

The preamble diversity switching process provides the benefit of selecting an antenna as signals are received. The system is less affected by rapid environmental change. However, problems arise when differences between RSSI values are insignificant. When insignificant differences exist, the system may experience some uncertainty when selecting an antenna. This is simply because minor differences in RSSI values indicate that the signal qualities received by the antennas are similar and therefore, an antenna selection will not necessarily improve receiving quality. Therefore, a preamble diversity switching process alone may not be the best parameter for selecting an antenna. An additional indicator may be desirable to select an optimal antenna.

It is therefore an object of the invention to implement an appropriate decision strategy in a DECT, PWT, and TDMA telecommunication systems that are based on real and predicted quality criteria.

Another object of the invention is to provide an improved antenna selection process for a TDMA telecommunication system that may pre-select an optimal antenna before an error is detected.

It is a further object of the invention to implement simple antenna-selection algorithms that identify the antenna that will receive the highest quality signals.

Still another object of the invention is to provide an improved antenna selection process for TDMA telecommunication systems that tracks ancillary quality factors such as error vectors and gradient error vectors.

Yet another object of the invention is to seamlessly integrate multiple quality indicators contemporaneously into a sophisticated antenna switching strategy for TDMA telecommunication systems.

SUMMARY OF THE INVENTION

A system for selecting an antenna from a diversity of antennas in a DECT, PWT, or TDMA-based telecommunication system is disclosed. The system combines multiple criteria to improve antenna diversity selections. The principal selection process is based on preamble diversity comparisons that operate in real-time. A preamble diversity switching circuit measures receive signal strength indicators (RSSI) from a plurality of antennas and selects the antenna that provides the highest RSSI value when the difference between the RSSI values exceeds a predetermined threshold. When the value of the RSSI difference falls below the predetermined threshold, a cyclical redundancy check process (CRC) and a vector detection process (SVD) are employed jointly. The CRC process decodes a CRC value from a signal's content and compares it to a predetermined threshold. If a CRC error is detected a first weighted function is calculated. In a first SVD process, the difference between a reference signal vector and a received signal vector is computed. If an SVD error is detected a second weighted function is calculated. When the sum of the first and second weighted factors is greater than a predetermined threshold antenna selection occurs. When the threshold is not met, diversity selections remain unchanged and control of the antenna selection process returns to the preamble diversity switching process. It should be noted, the SVD process may also be based on the gradient error vector, $\nabla f(E_{k,n1})$, which represents the magnitude of the received signal's rate of change.

DETAILED DESCRIPTION OF THE PRESENTLY PREFERRED EMBODIMENTS

Figure 1:
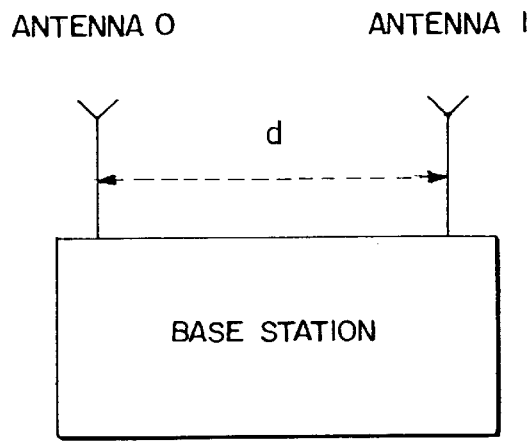
FIG. 1 is a block diagram of a conventional wireless base station having a diversity of antennas.
Figure 2:
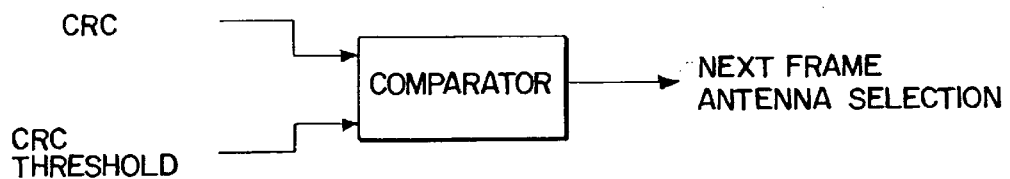
FIG. 2 is a block diagram of a Cyclical Redundancy Check antenna switching process used in the prior-art station of FIG. 1.
Figure 3:
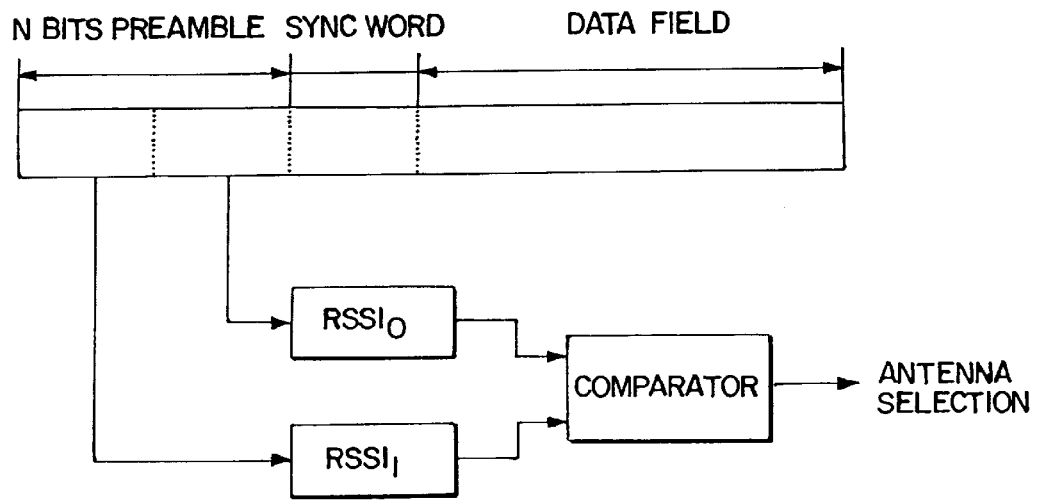
FIG. 3 is a block diagram of a Preamble Diversity Switching Process also used in the prior-art station of FIG. 1.

In the drawings, depicted elements are not necessarily drawn to scale and alike and similar elements may be designated by the same reference numerals through several views.

The signal vector detection (SVD) process used in a first embodiment focuses on phase modeling and phase prediction of broadcast signals for TDMA communication systems. In this process, a signal vector detection error or error vector $E_{k,n1}$ is calculated by subtracting an estimated signal vector $\hat{S}_{k,n1}$ from a reference signal vector $S_{k,n1}$ ($E_{k,n1}=S_{k,n1}-\hat{S}_{k,n1}$). A function, $f(E_{k,n1})$, is then calculated. In this embodiment, a sum (SUM) of the absolute value (ABS) of $E_{k,n1}$, is calculated ($f(E_{k,n1})=\text{SUM}(\text{ABS } E_{k,n1})$). However, other mathematical functions may be used. Since $E_{k,n1}$ is measured during the receiving process and is compared to a predetermined threshold, an antenna selection decision will not occur in real time as in a batch process. However, the signal detection process may also be based on a second criteria, a gradient error vector, $\nabla f(E_{k,n1})$.

The term "gradient" as used in this specification is used to describe a vector that represents the magnitude of a signal's rate of change. With respect to TDMA utilization, an antenna selection based on the gradient error vector can initiate antenna selections before signal quality declines.

Figure 4:
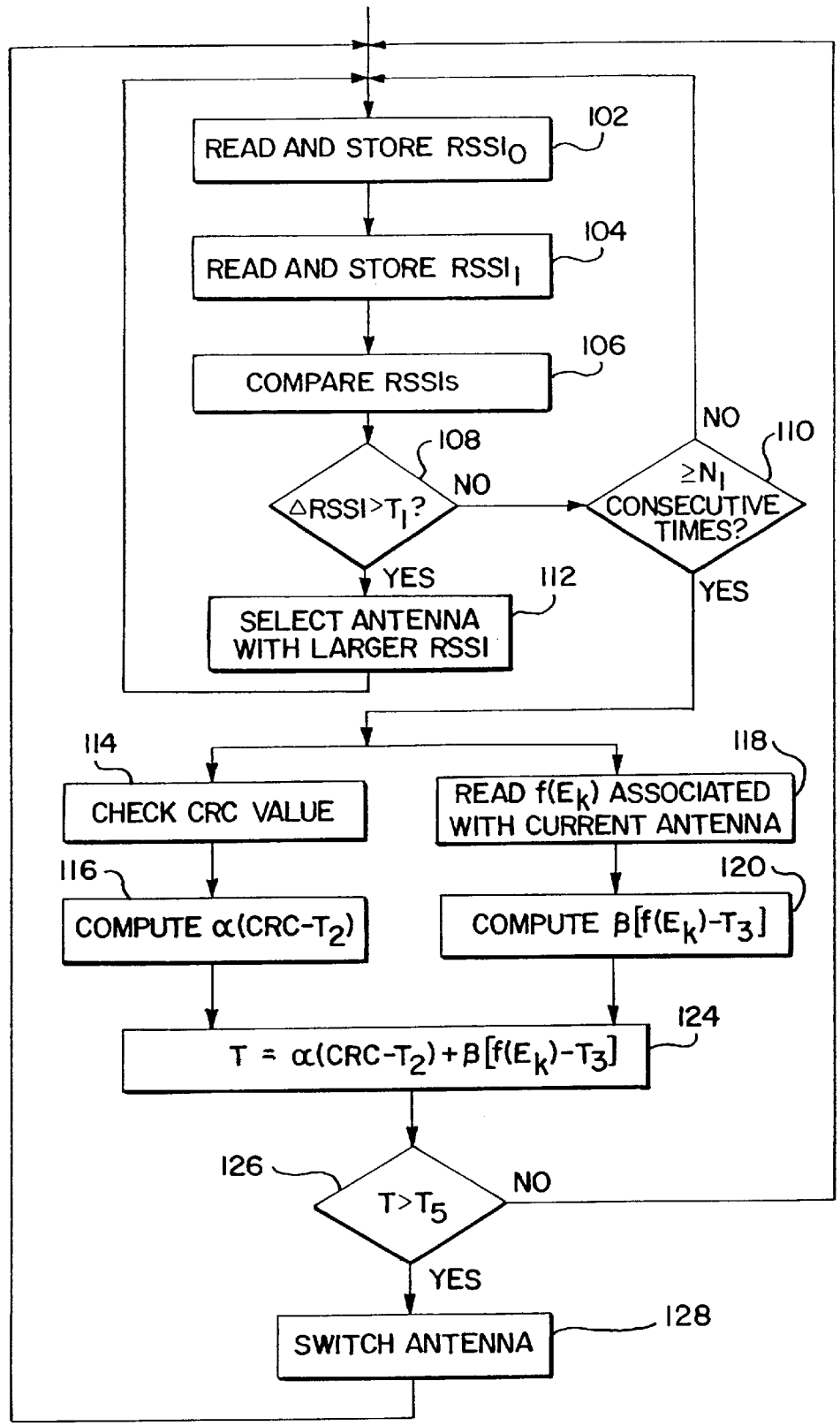
FIG. 4 is a flow chart of a first embodiment of the antenna switching process.

In accordance with the first embodiment, an antenna selection system is illustrated in FIG. 4. This embodiment seamlessly integrates a preamble diversity switching process (PDS), a first authentication process, with a cyclical redundancy check (CRC) process, a second authentication process, and the signal vector detection (SVD) process, a third authentication process, to form a unified antenna switching strategy that tracks signal quality.

As shown, radio frequency broadcasts are sequentially processed into receive signal strength indicators $RSSI_0$ and $RSSI_1$ and are stored, where $RSSI_0$ is measured from a first antenna ($Antenna_0$) and $RSSI_1$ is measured from a second antenna ($Antenna_1$) (steps 102 and 104). $RSS_0$ and $RSSI_1$ are then compared to generate a RSSI difference signal ($\Delta RSSI$) (step 106). When $\Delta RSSI$ is greater than or equal to a first predetermined quality threshold value $T_1$, the antenna having the highest RSSI value is selected and an N-bit counter is reset (steps 108 and 112). However, when $\Delta RSSI$ is less than $T_1$, the N-bit counter is incremented and then compared to a predetermined slot count $N_1$ (steps 108 and 110). If the value of the N-bit counter is less than $N_1$, protocol requires that the preamble diversity switching process begin a new cycle (step 110). If, however, the value of the N-bit counter is equal to or greater than $N_1$, protocol initiates joint CRC and SVD control (steps 110).

As described previously, a CRC like parameter authenticates data after the data is received as in a batch process. In this process, the transmitted signal is encoded with a circular redundant code derived from the signal's content. After the signal is received and decoded into a CRC error rate a weighted CRC error rate is calculated by scaling the difference between the CRC error rate and a second predetermined quality threshold value, $T_2$ ($\sigma(CRC-T_2)$) (steps 114 and 116). In this embodiment a predetermined CRC error rate is used as the threshold value to ensure high quality data and audio communications. A CRC error rate of 1%, for example, may be used as the threshold $T_2$ for audio communications, because a CRC error rate below 1% generally produces good voice quality.

In the SVD process, $f(E_{k,n1})$ associated with the current antenna is read and stored (step 118). A weighted SVD error rate is then calculated by scaling the difference between $f(E_{k,n1})$ and a third predetermined quality threshold value, $T_3$ ($\beta(f(E_{k,n1})-T_3)$) (step 120). When the sum of the weighted CRC and SVD error rates ($\sigma(CRC-T_2)+\beta(f(E_{k,n1})-T_3)$ where $\sigma+\beta=1$) is greater than a fifth predetermined quality threshold value $T_5$, another antenna is selected and control is returned to the PDS process (steps 124, 126, and 128). However, when the sum of the weighted CRC and SVD error rates is equal to or is less than $T_5$, no diversity selections occur and control is returned to the PDS process (steps 124 and 126). In this embodiment, the fifth predetermined threshold is equal to zero. However, those skilled in the art understand that $T_5$ will vary according to the environment of the embodiments use.

Figure 5:
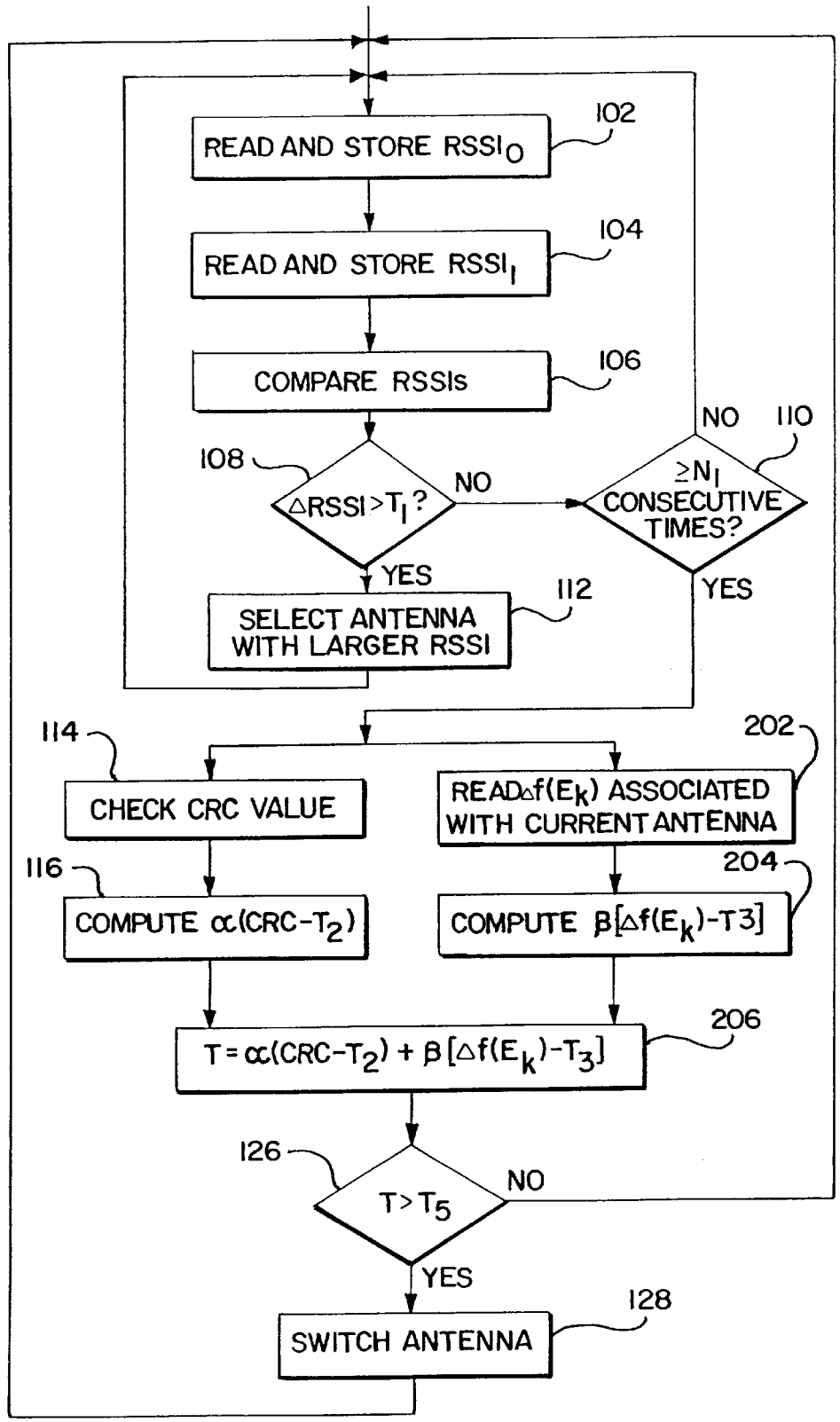
FIG. 5 is a flow chart of a second embodiment of the antenna switching process.

The second embodiment illustrated in FIG. 5 is similar to that depicted in FIG. 4. However, in this embodiment the SVD process is based on the gradient error vector, $\nabla f(E_{k,n1})$, rather than the error vector, $f(E_{k,n1})$. In this configuration, $f(E_{k-1,n1})$ from multiple previous time frames are measured and stored. The $f(E_{k,n1})$ associated with the current antenna is then read and compared to $f(E_{k-1,n1})$ to generate the $\nabla f(E_{k,n1})$ value ($\nabla f(E_{k,n1})=f(E_{k,n1})-f(E_{k-1,n1})$) (step 202). A weighted SVD error rate is calculated by scaling the difference between $\nabla f(E_{k,n1})$ and a third predetermined quality threshold value, $T_3$ ($\beta((\nabla f(E_{k,n1})-T_3))$) (step 204). Like the first embodiment, when the sum of the weighted CRC and SVD error rates ($\sigma(CRC-T_2)+\beta(\nabla f(E_{k,n1})-T_3$) where $\sigma+\beta=1$) is greater than the fifth predetermined quality threshold value $T_5$, another antenna is selected and control is returned to the PDS process (steps 206, 126, and 128).

Figure 6:
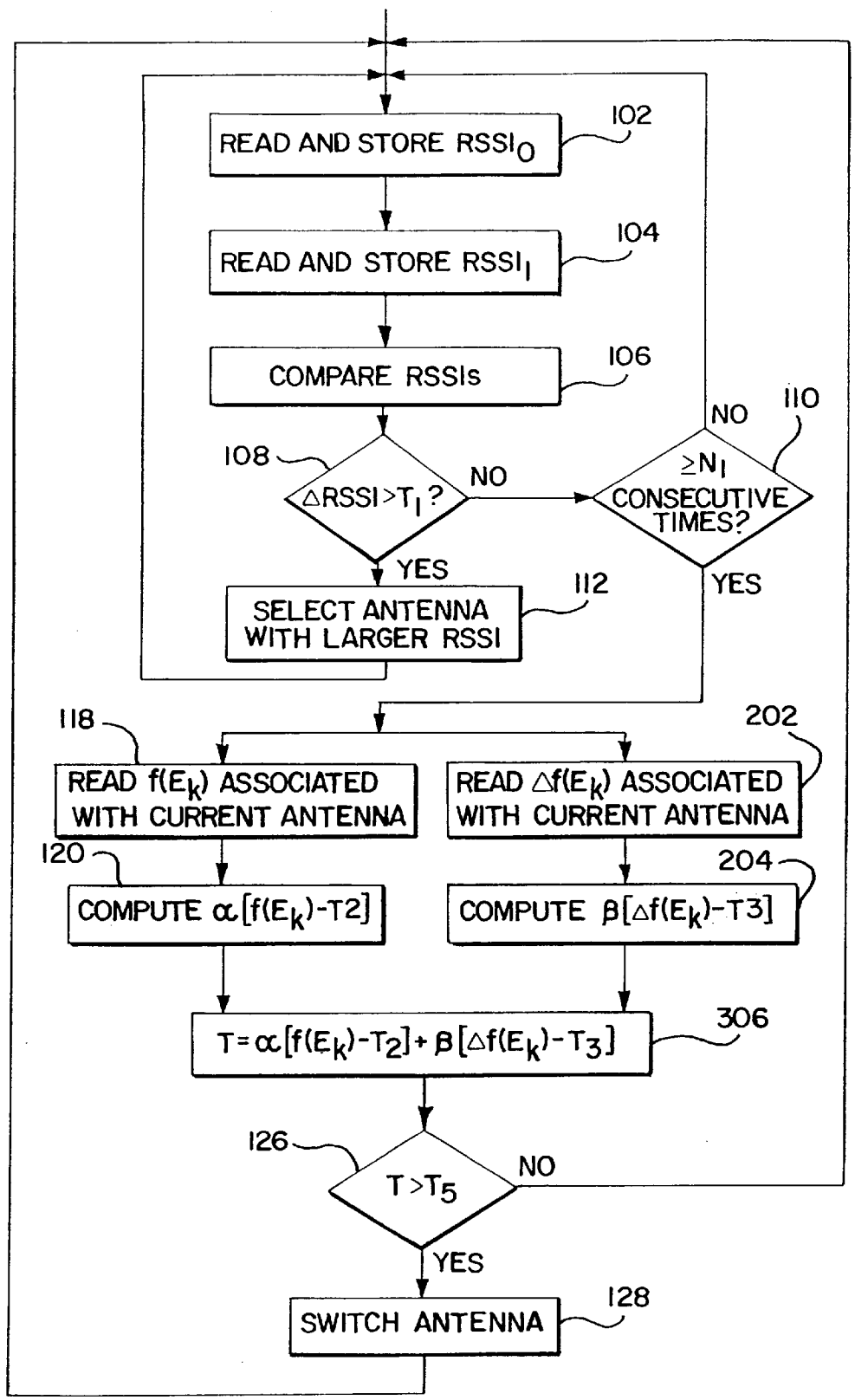
FIG. 6 is a flow chart of a third embodiment of the antenna switching process.

FIG. 6 shows a third embodiment wherein the authentication process includes the PDS, $f(E_{k,n1})$, and $\nabla f(E_{k,n1})$ processes. Like the prior configurations, the authentication process begins with the PDS process that does not delegate antenna diversity control until $N_1$ consecutive instances in which $\Delta RSSI$ is less than $T_1$ (steps 108 and 110). When $\Delta RSSI$ is less than $T_1$, $f(E_{k,n1})$, and $\nabla f(E_{k,n1})$ process criteria are employed. Like the prior two embodiments, the SVD criteria are identical to the prior embodiments and therefore are not repeated. When control is delegated to the SVD criteria, the decision threshold is calculated by summing the scaled SVD error rates ($\sigma(f(E_{k,n1})-T_2)+\beta(\nabla f(E_{k,n1})-T_3)$ where $\sigma+\beta=1$). When the scaled sum of the SVD error rates is greater than $T_5$, another antenna is selected and control is returned to the PDS process (steps 126 and 128).

Figure 7:
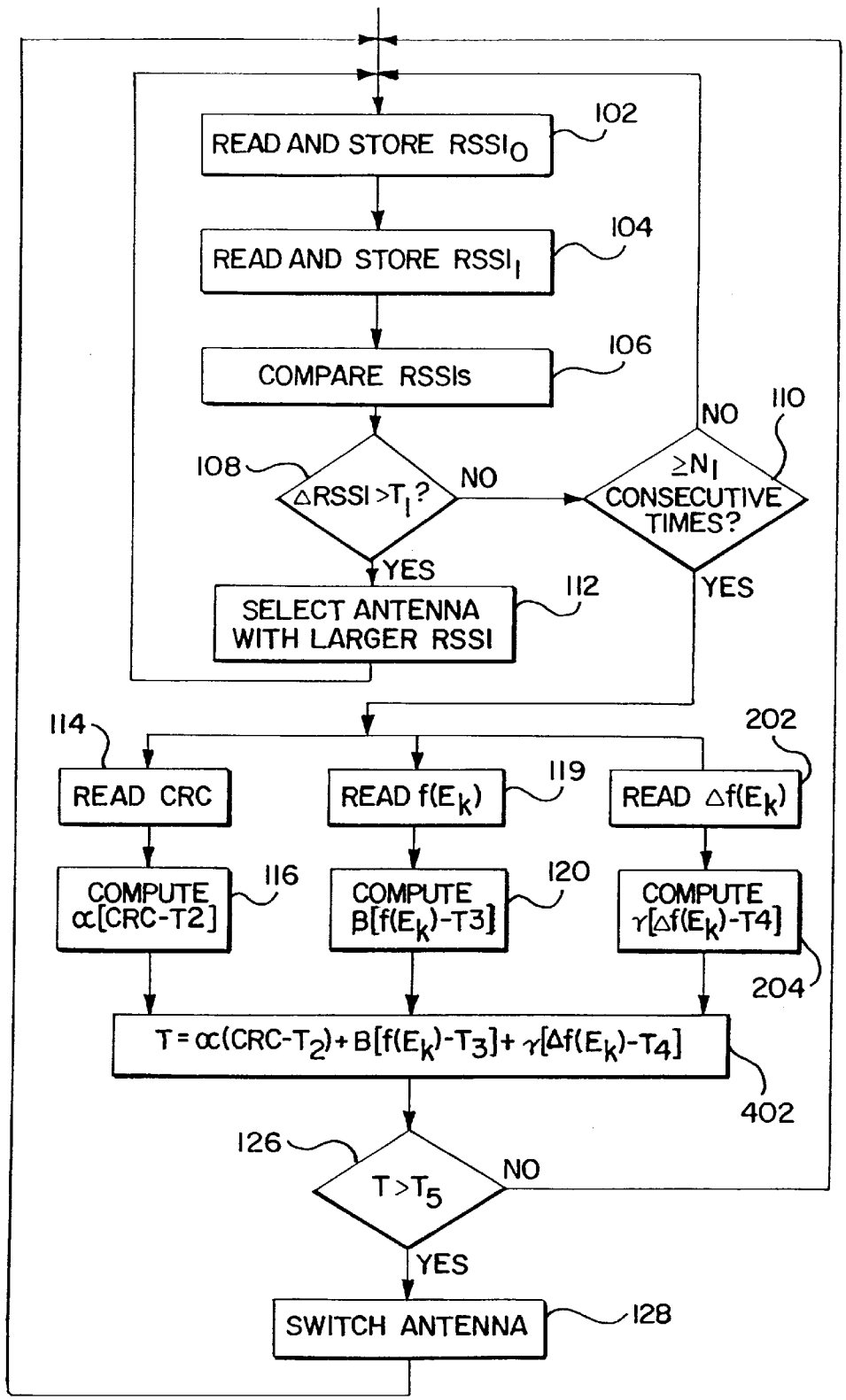
FIG. 7 is a flow chart of a fourth embodiment of the antenna switching process.

The embodiment depicted in FIG. 7 is similar to that depicted in FIGS. 6, but further comprises the steps of contemporaneously evaluating the CRC process. Thus, FIG. 7 constitutes a further improvement of the embodiment shown in FIG. 6 by evaluating additional reliability criteria. In accordance with a fourth embodiment, illustrated as FIG. 7, the processing steps of reading and calculating the respective CRC and $f(E_{k,n1})$, and $\nabla f(E_{k,n1})$ are identical to the prior embodiments and therefore are not repeated. In this embodiment, when control authority is delegated to the synchronous time-delayed indicators, the decision threshold is the scaled sum of the CRC, $f(E_{k,n1})$, and $\nabla f(E_{k,n1})$ processes ($\sigma(CRC-T_2)+\beta(f(E_{k,n1})-T_3)+\gamma(\nabla f(E_{k,n1})-T_4)$ where $\alpha+\beta+\gamma=1$) (step 402). When the sum of the weighted CRC and SVD error rates is greater than the fifth predetermined quality threshold value, $T_5$, another antenna is selected and control is returned to the PDS process (steps 402, 126, and 128). However, when the weighted sum of the CRC and SVD error rates is equal to or is less than $T_5$, no diversity selections occur and control is returned to the PDS process (step 126).

Figure 8:
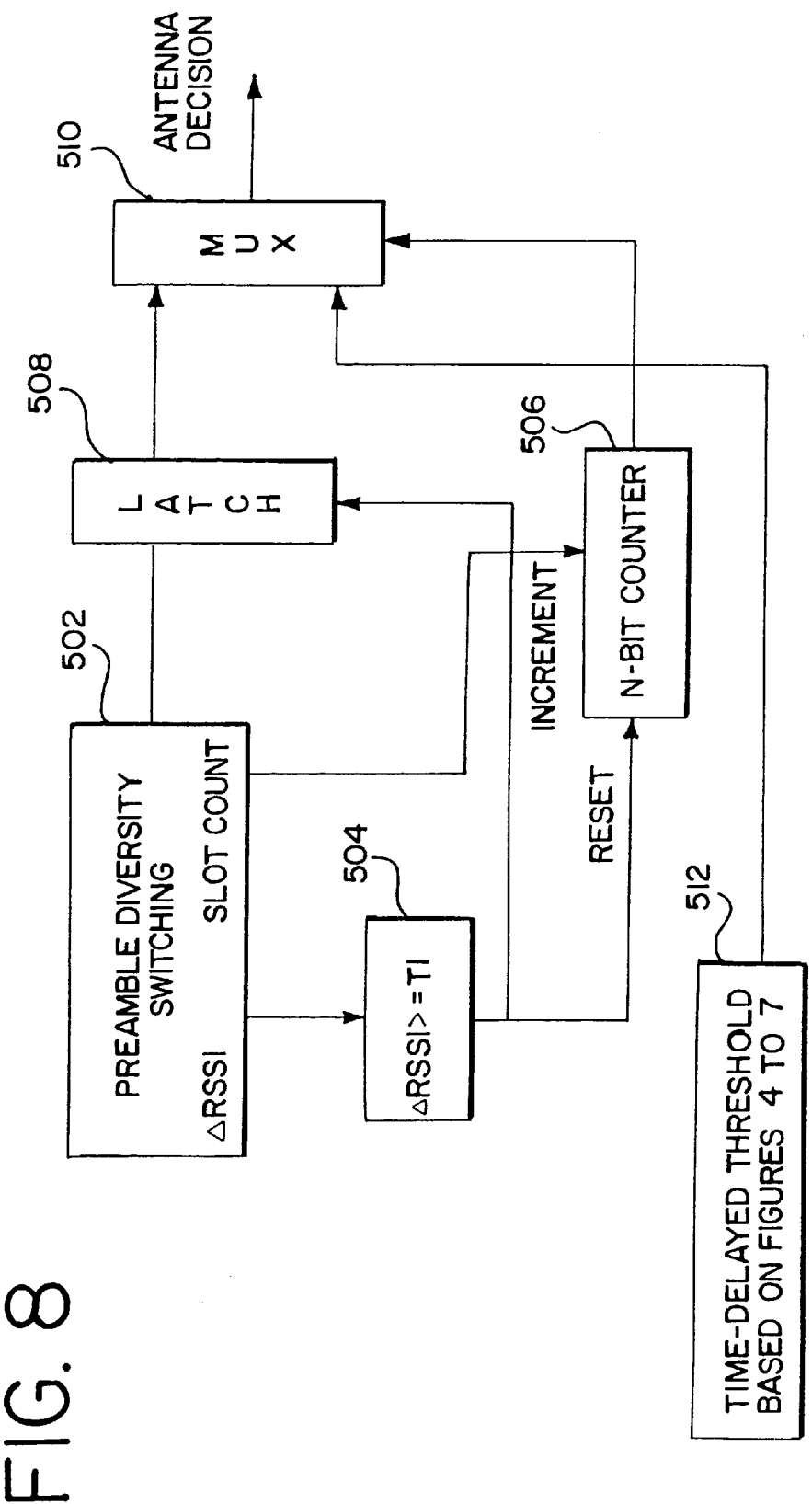
FIG. 8 is a schematic diagram of the of the antenna switching circuits used in the antenna switching processes of FIGS. 4–7.

The concepts and processes previously illustrated may be implemented through software or logic circuitry. The aforementioned embodiments were employed using logic circuitry. As depicted in FIG. 8, when the broadcast signals are received, the signals are processed using a PDS circuit 502. The PDS circuit 502 produces the $\Delta RSSI$ signal which is fed to a comparator circuit 504 by a first output. When the $\Delta RSSI$ is greater than or equal to the first predetermined quality threshold value $T_1$, the comparator 504 resets an N-bit counter circuit 506 and enables a latch circuit 508. The latch circuit 508 latches a second output from the PDS circuit 502 to a multiplexer circuit 510 enabled by the N-bit counter circuit 506 control to initiate antenna selections. Once the $\Delta RSSI$ falls below $T_1$, the counter circuit 506 is incremented in response to a third output from the PDS control circuit 502. In this embodiment, after more than $N_1$ consecutive low $\Delta RSSI$ cycles, control of the antenna selection is transferred to a plurality of synchronous time-delayed criteria circuitry 512 by the N-bit counter circuits 506 control of the multiplexer circuit 510. The time delayed circuitry 512 that processes CRC, $f(E_{k,n1})$ and $\nabla f(E_{k,n1})$ are described in the U.S. patent applications that were incorporated by reference with additional signal conditioning implemented through conventional adders, multipliers, and comparator circuitry. The time delayed circuitry 512 controls antenna selection until the $\Delta RSSI$ equals or exceeds $T_1$. When $\Delta RSSI$ equals or exceeds $T_1$, the PDS circuit 502 reacquires control of the selection process and the comparator circuit 504 resets the counter circuit 510.

Those skilled in the art will implement the steps necessary to provide the device and methods disclosed herein and understand the process parameters including $T_1$, $T_2$, $T_3$, $T_4$, $T_5$, $\alpha$, $\beta$, $\gamma$ and $N_1$ vary according to the environment of the embodiment's use as rural and urban areas have different receiving characteristics. The disclosed embodiments and concepts of the invention enjoy utility in any type of TDMA telecommunication system where data authentication occurs.

Only the embodiments of the invention and examples of its versatility are described within this disclosure. Variations and modifications of the embodiments disclosed herein may be made based on the description herein disclosed, without departing from the scope and spirit of the invention set forth in the following claims.

We claim:

1. An antenna selection and switching system which is capable of selecting an antenna from a diversity of antennas by verifying the integrity of electronic signals received from said diversity of antennas in a TDMA wireless-type communication system, wherein the system comprises:

a preamble diversity switching process linked to said diversity of antennas for selecting an antenna based on a received signal preamble integrity;

a time delayed criteria process linked to said diversity of antennas and communicating with said preamble diversity switching process comprising:

a cyclical redundancy code process capable of evaluating said signal integrity using a cyclical code encryption process;

a signal vector detection process capable of evaluating said signal integrity contemporaneously with said cyclical redundancy code process based on a received signal phase integrity; and selection means for selectively identifying said antenna selection based on said cyclical redundancy code process and said signal vector detection process; and protocol means coupled to said diversity of antennas for selecting from among said preamble diversity switching process and said time delayed criteria process for providing said antenna selection.

2. An antenna selection and switching system as defined in claim 1, wherein said protocol means is responsive first to the operability of said preamble diversity switching process and second to the operability of said time delayed criteria process.

3. An antenna selection and switching system as defined in claim 1, wherein said protocol means for selecting said antenna further comprises an N-bit counter for selectively delaying said antenna selection.

4. An antenna selection and switching system as defined in claim 1, wherein said TDMA wireless-type communication system further comprises a plurality of antennas responsive to TDMA transmissions.

5. The antenna selection and switching system as defined in claim 1, wherein said selection means identifies said antenna selection by applying a weighted criteria to said cyclical redundancy code process and said signal vector detection process.

6. The antenna selection and switching system as defined in claim 1, wherein said signal vector detection process is based on the strength of an error vector of said signal.

7. The antenna selection and switching system as defined in claim 1, wherein said signal vector detection process is based on the strength of a plurality of gradient error vectors of said signals.

8. The antenna selection and switching system as defined in claim 1, wherein said time-delayed criteria utilize programmable thresholds for said detection processes.

9. The antenna selection and switching system as defined in claim 3, wherein said N-bit counter is reset to a pre-set value in response to said preamble diversity switching process selection of said antenna.

10. An antenna selection and switching system as defined in claim 3, wherein said N-bit counter is programmable and has memory means for storing information corresponding to said process selections thereby identifying a combination of processes most frequently utilized.

11. An antenna selection and switching system as defined in claim 3, wherein said N-bit counter is programmable and has a memory array for storing information corresponding to the location of a plurality of portables.

12. An improved system for selecting a single antenna in a DECT/PWT-based telephone communication system that is capable of verifying the quality of transmitted signals, comprising:
    first means switchably coupled to said diversity of antennas for authenticating said signals and selecting a communication path from said diversity of antennas as said signals are received using a preamble diversity switching process;
    second means switchably coupled to said first means for authenticating said signals and selecting a communication path from said diversity of antennas after said signals are received comprising:
        a signal vector detection process capable of synchronously appraising the strength of a plurality of error vectors and a plurality of gradient error vectors of said transmitted signals; and
        selection means, coupled to said signal vector detection process, for selecting a communication path from said diversity of antennas based on a weighted function of said plurality of error vectors and said plurality of gradient error vectors; and
    protocol means controllably coupled to said antennas for transferring said antenna selection between said first means and said second means so as to overcome reception errors caused by multipath interference.

13. The system as defined in claim 12, wherein said protocol means for selecting said antenna further comprises an N-bit counter for selectively delaying said antenna selection.

14. The system as defined in claim 12, wherein said DECT/PWT-based telephone communication system further comprises a plurality of antennas responsive to DECT/PWT transmissions.

15. The system as defined in claim 12, wherein said first means selection of said antenna is delayed until said received signal quality at least equals a first predetermined quality threshold.

16. The system as defined in claim 12, wherein said second means selection of said antenna is delayed until said received signal quality exceeds a second predetermined quality threshold.

17. The system as defined in claim 12, wherein said N-bit counter is reset to a pre-set value in response to said preamble diversity switching process selection of said antenna.

18. The system as defined in claim 12, wherein said N-bit counter is programmable and has memory means for storing information corresponding to said process selections thereby identifying a combination of processes most frequently utilized.

19. The system as defined in claim 12, wherein said N-bit counter is programmable and has a memory array for storing information corresponding to the location of a plurality of portables.

20. An antenna diversity switching device used in a TDMA based communication system which is capable of selecting a single antenna from a plurality of antennas in response to the quality of signals received from said plurality antennas, wherein the system comprises:
    means for detecting said signal quality in both
        a real mode responsive to said signal quality measured as said signals are received; and
        a batch mode responsive to said signal cyclical redundancy code and phase quality measured synchronously after said signals are received; and
    a controller operatively linked to said detection means for selecting said single antenna in response to one of said detection means.

21. The antenna diversity switching device as defined in claim 20, wherein said controller delays said real mode selection of said antenna until a predetermined threshold is exceeded.

22. The antenna diversity switching device as defined in claim 20, wherein said controller is interfaced to a programmable numerical counter having advancing means for delaying said controllers selection of said antenna in said batch mode until the value of said counter equals the value of a predetermined number.

23. The antenna diversity switching device as defined in claim 20, wherein said controller's selection of said antenna in response to said real mode detection means is delayed until said received signal quality at least equals a first predetermined quality threshold.

24. The antenna diversity switching device as defined in claim 20, wherein said controller's selection of said antenna in response to said batch mode detection means is based on a weighted function of said cyclical redundancy code, a plurality of error vectors, and a plurality of gradient error vectors of said signal.

25. The antenna diversity switching device as defined in claim 22, wherein said controller resets said counter to a pre-set value on selection of said single antenna in response to said real mode detection means.

26. The antenna diversity switching device as defined in claim 22, wherein said programmable numerical counter has memory means for storing information corresponding to said process selections thereby identifying a combination of processes most frequently utilized.

27. The antenna diversity switching device as defined in claim 22, wherein said programmable numerical counter has a memory array for storing information corresponding to the location of a plurality of portables.

28. A TDMA-based diversity antenna switching system for selecting a single antenna comprising:
   a plurality of antennas for receiving TDMA based signals;
   a primary controller switchably linked to said plurality of antennas for authenticating said received signals and selecting said single antenna as a signal is authenticated using a preamble diversity switching process;
   a secondary controller switchably linked to said plurality of antennas for authenticating said received signals and selecting said single antenna as a signal is authenticated using a signal vector detection process concurrently with a cyclical redundancy code process; and
   a switching device controllably linked to said first and second controllers for selecting one of said first and second controllers.

29. The TDMA-based diversity antenna switching system as defined in claim 28, wherein said switching device is responsive first to said primary controller and second to said secondary controller.

30. The TDMA-based diversity antenna switching system as defined in claim 28, wherein said switching device includes means for delaying said antenna selection and has a memory array capable of storing information corresponding to the location of a plurality of portables.

31. The TDMA-based diversity antenna switching system as defined in claim 28, wherein said signal vector detection process is a function of a signal vector error process and a plurality of gradient error vectors.

32. A method of selecting a TDMA-based telephone communication antenna for receiving signals, said method comprising:
   receiving a signal from a plurality of antennas;
   processing said signal alternatively in a preamble diversity mode and in a delayed criteria detection mode comprising:
      a plurality of signal vector detection processes contemporaneously linked to a cyclical redundancy code process; and then
   selecting said antenna from said plurality of antennas by verifying the authenticity of said received signal in response to one of said processing modes.

33. The method of claim 32, wherein said processing of said signal is selectively delayed in response to a numerical counter.

34. The method of claim 32, wherein said signal vector detection mode is based on an error vector and a gradient error vector of said received signal.

35. The method of claims 32, wherein the method is capable of storing information corresponding to the location of a plurality of portables.

36. The method of claims 32, wherein the method is capable of storing information corresponding to said process selections thereby identifying a combination of processes most frequently utilized.

* * * * *

UNITED STATES PATENT AND TRADEMARK OFFICE
CERTIFICATE OF CORRECTION

PATENT NO. : 5,952,963
DATED : September 14, 1999
INVENTOR(S) : Qun Shen et al.   Page 1 of 2

It is certified that error appears in the above-identified patent and that said Letters Patent is hereby corrected as shown below:

On the Title Page

In column 1, line 1, under "OTHER PUBLICATIONS", change "Proise" to --Prosise--.

In column 1, line 4, under "OTHER PUBLICATIONS", change "An" to --AN--; and "redundancy" to --Redundancy--.

In column 1, line 5, change "tech" to --teach--.

In column 2, line 1, change "ANT" to --ANY--.

In column 2, line 4, change "com.lectro" to --com/lectro--.

In column 2, line 8, change "1966" to --1996--.

In column 2, line 10, change "Advaced" to --Advanced--.

In column 2, line 11, change "Eletrical Enigineering" to --Electrical Engineering--.

In column 2, line 12, after "Leeds" (second occurrence) insert --LS2--.

UNITED STATES PATENT AND TRADEMARK OFFICE
CERTIFICATE OF CORRECTION

PATENT NO. :  5,952,963
DATED      :  September 14, 1999
INVENTOR(S):  Qun Shen et al.

It is certified that error appears in the above-identified patent and that said Letters Patent is hereby corrected as shown below:

In claim 35, line 1, change "claims" to --claim--.

In claim 36, line 1, change "claims" to --claim--.

Signed and Sealed this

Thirtieth Day of May, 2000

Attest:

Q. TODD DICKINSON

*Attesting Officer*  *Director of Patents and Trademarks*